(No Model.)
J. B. SMITH & A. L. JULIENNE.
SIPHON.
No. 579,501. Patented Mar. 23, 1897.
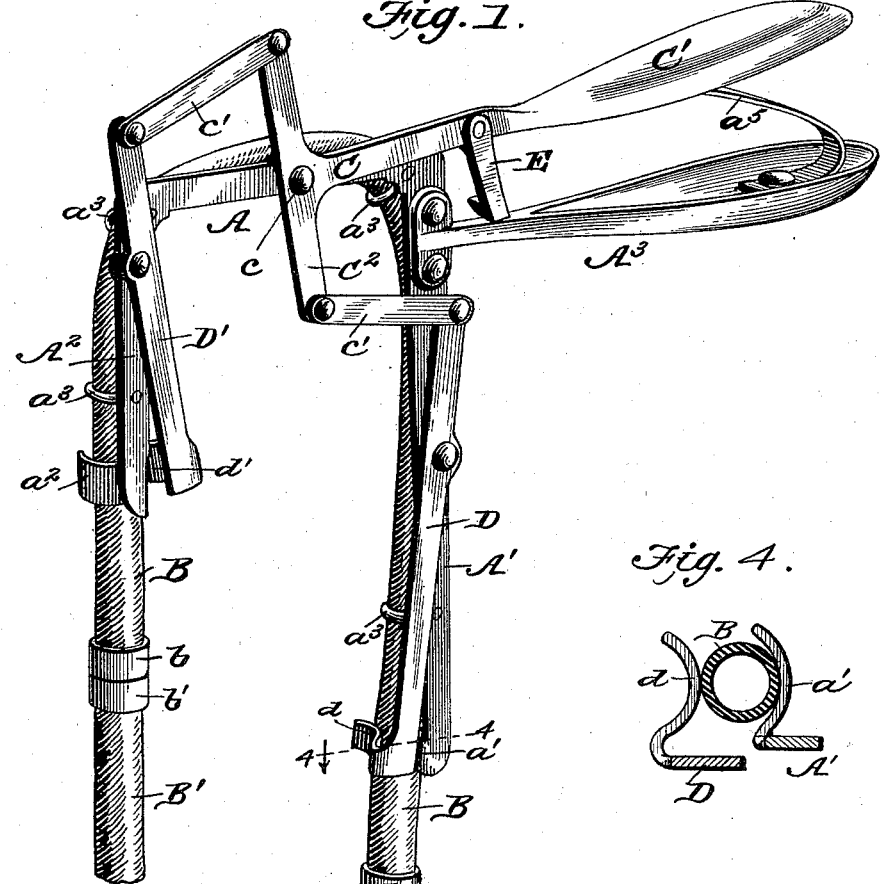
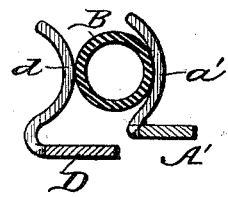
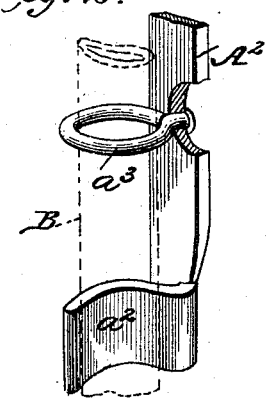
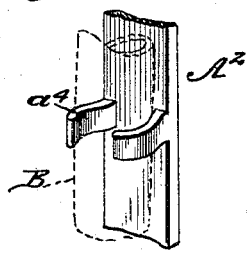
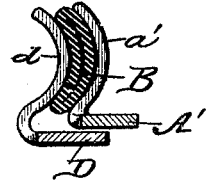
WITNESSES:
M. A. Bloudel.
Jos. A. Ryan
INVENTORS
James B. Smith.
Adolphe L. Julienne.
BY Munn & Co.
ATTORNEYS.

UNITED STATES PATENT OFFICE.

JAMES B. SMITH AND ADOLPHE L. JULIENNE, OF JACKSON, MISSISSIPPI.

SIPHON.

SPECIFICATION forming part of Letters Patent No. 579,501, dated March 23, 1897.

Application filed February 17, 1896. Serial No. 579,576. (No model.)

*To all whom it may concern:*

Be it known that we, JAMES B. SMITH and ADOLPHE L. JULIENNE, citizens of the United States, residing at Jackson, in the county of Hinds and State of Mississippi, have invented certain new and useful Improvements in Siphons, of which the following is a full, clear, and exact description, reference being had to the accompanying drawings, forming part thereof, in which—

Figure 1 is a perspective view of our improved siphon. Fig. 2 is a detail perspective view of one of the eyes for holding the tube in position on the frame. Fig. 3 is a detail view of a modified form of holding the tube. Fig. 4 is a section on the line 4 4, Fig. 1; and Fig. 5 is a similar view showing the jaws locked and the tube compressed.

Our invention relates to that class of siphons which are provided with valves in both legs to retain the liquid therein and obviate refilling the siphon for every operation.

The object of our invention is to provide a siphon with a simple and effective means for simultaneously closing the flow through both legs; also, to provide a suitable frame for carrying a flexible siphon-tube and connected clamps on the frame for simultaneously compressing or releasing the tubes.

The invention will first be described and then specifically set forth in the claims.

A is a ∩-shaped frame having a long arm A' and a shorter arm $A^2$, the ends of which terminate in laterally-projecting curved jaws $a'$ $a^2$, respectively. The side of the frame, above these jaws, is provided with a guideway formed of a series of round eyes $a^3$, as in Fig. 2, or of a half-round flange $a^4$, as shown in Fig. 3.

B is the rubber siphon-tube, which is held in this guideway with its ends extended down past the two jaws $a'$ $a^2$, as far as may be desired. The ends of the tube are provided with couplings $b$ $b'$, by which sections of tubing B' may be coupled thereto, if found necessary. From the arm A' of the frame A projects a handle $A^3$, and to the top of the frame a horizontal T-shaped lever C is pivoted at the juncture of its arms, as shown at $c$, the long arm of the lever forming its handle C', which extends parallel with the handle $A^3$ and is pressed upwardly therefrom by the spring $a^5$.

D and D' are two clamping-levers pivoted between their ends to the arms $A'$ $A^2$ of the frame and terminating at their lower ends in the laterally-projecting convex curved jaws $d$ $d'$, which register with the jaws $a'$ $a^2$ to press the tube B thereagainst and shut off the flow of liquid therethrough.

The upper ends of the clamping-levers D D' are connected to the opposite ends of the vertically-extending head $C^2$ of the operating-lever C by means of the links $c'$, so that when the handles C' $A^3$ are pressed together the upper ends of the levers D D' will be forced toward each other and the jaws $d$ $d'$ will firmly compress the tube against the jaws $a'$ $a^2$.

E is a spring-catch mounted on the handle C' and engaging the handle $A^3$ when it is forced down, so as to lock the two handles together and thereby lock the clamping-levers and their jaws in their closed positions, so that the siphon may be left in its charged condition ready for instant use.

The operation is as follows: The rubber tube is inverted and filled by pouring the liquid therein or by submerging the tube in the liquid, and then the handles are forced together to cause the compression of the tube between both pairs of jaws. The siphon may now be used for any desired length of time in siphoning the contents of one vessel into another by simply releasing the handles to permit the flow through the tube, and but one hand is necessary, as the entire apparatus may be carried from place to place and operated by the hand which grasps the handles.

Broadly speaking, our siphon is provided with valved legs, the valves of which are connected for simultaneous operation in either direction by a lever mechanism.

Having thus described our invention, what we claim as new, and desire to secure by Letters Patent, is—

1. A siphon consisting of a frame provided with clamping-jaws adapted to receive the flexible ends of a siphon-tube, and lever mechanism for simultaneously operating said jaws, as set forth.

2. In a siphon, a frame provided with a tube guide or support, two tube clamps and compressors, and a lever mechanism mounted on said frame and adapted to simultaneously operate said clamps or compressors, as set forth.

3. In a siphon, a frame provided with two clamps or compressors adapted to receive a flexible siphon-tube and mechanism mounted on the frame and connecting said clamps or compressors for simultaneous operation, substantially as set forth.

4. A frame for siphons provided with handles one of which is movable, tube clamps or compressors, for the two legs of a flexible siphon-tube and connections between the movable handle and the said clamps or compressors, substantially as set forth.

5. The combination with a tube-carrying frame having depending arms terminating in jaws, and a handle thereabove, of a clamping-lever on each of said arms and provided with clamping-jaws to compress the tube against the jaws on said frame, and an operating-lever pivoted to the upper portion of the frame, linked to said clamping-levers and having a handle extending along the frame-handle substantially as set forth.

6. The combination with a tube-carrying frame having depending arms terminating in jaws, the clamping-levers terminating at their lower ends in jaws registering with those on the frame and a lever mechanism connecting the upper ends of said clamping-levers, substantially as set forth.

7. The combination with a ∩-shaped frame having a tube guide or support, and a fixed and a pivoted handle, of clamping-levers pivoted between their ends to the depending arms of the frame; and the lower ends of the levers and arms of the frame forming tube clamping or compressing jaws, and links connecting the upper ends of said clamping-levers to the operating handle or lever substantially as set forth.

8. The combination with a frame, a ∩-shaped flexible tube mounted thereon, a fixed and a movable spring-pressed handle or lever on said frame, of clamps or compressors engaging both legs of said tube and operatively connected to the said spring-pressed lever or handle substantially as set forth.

9. The combination with the frame, the ∩-shaped rubber siphon-tube mounted thereon, a fixed and a spring-pressed handle or lever on the frame, and a catch for securing said handles or levers together, of clamping or compressing devices of the two legs of the tube and operative connections between the spring-pressed handle or lever and the clamps or compressors, substantially as set forth.

10. The combination with the ∩-shaped tube-carrying frame having its ends terminating in laterally-projecting clamps, and a fixed and a movable T-shaped spring-pressed handle at the upper end of the frame, clamping-levers pivoted between their ends to the respective legs of the frame and terminating at their lower ends in laterally-projecting jaws registering with those on the frame, and links connecting the upper ends of the clamping-levers with the opposite ends of the head of the operating lever or handle substantially as set forth.

JAMES B. SMITH.
ADOLPHE L. JULIENNE.

Witnesses:
H. A. POSEY,
T. J. GOULDMAN.